Jan. 13, 1970     J. C. RUBIN ET AL     3,489,146
ARTIFICIAL KIDNEY SYSTEM
Filed Jan. 12, 1967     7 Sheets-Sheet 1
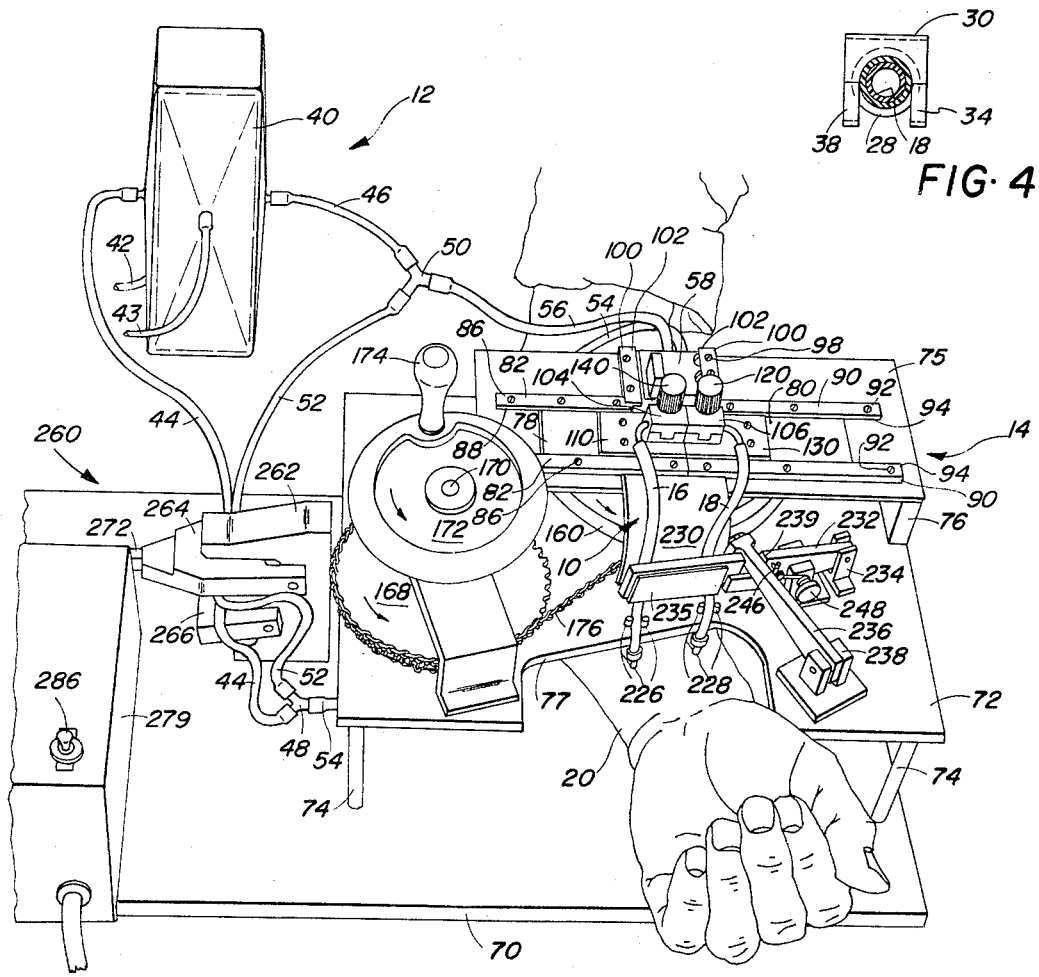
FIG. 1
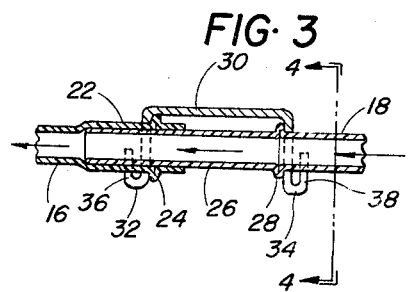
FIG. 4
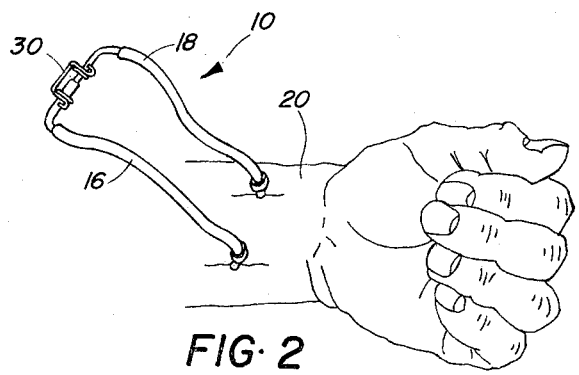
FIG. 2
FIG. 3
JACOB C. RUBIN
BRUNO LINGER
EDWARD J. MATTSON
INVENTORS
BY
ATTORNEYS

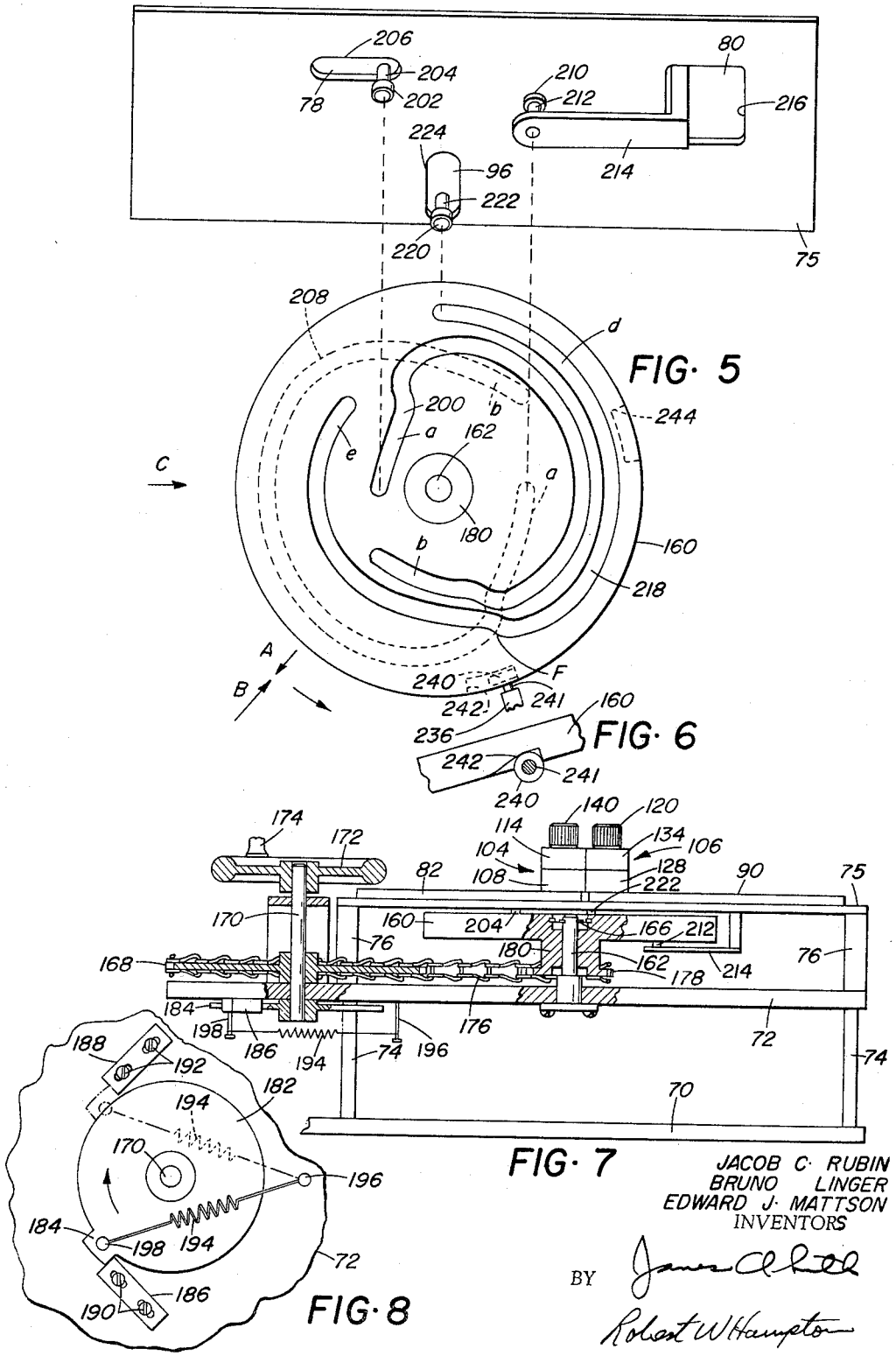

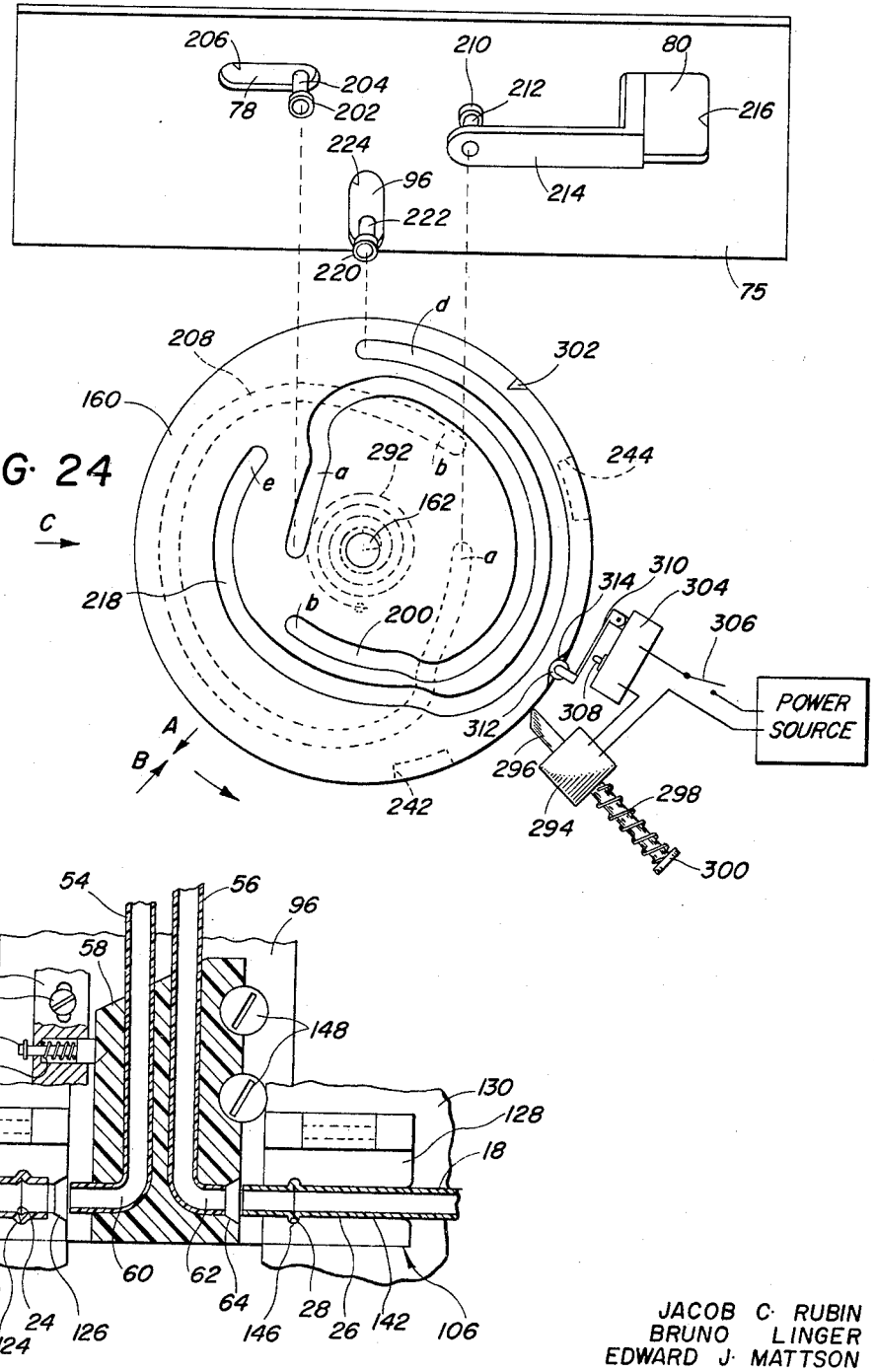

Jan. 13, 1970  J. C. RUBIN ET AL  3,489,146
ARTIFICIAL KIDNEY SYSTEM
Filed Jan. 12, 1967  7 Sheets-Sheet 5

JACOB C. RUBIN
BRUNO LINGER
EDWARD J. MATTSON
INVENTORS

BY
ATTORNEYS

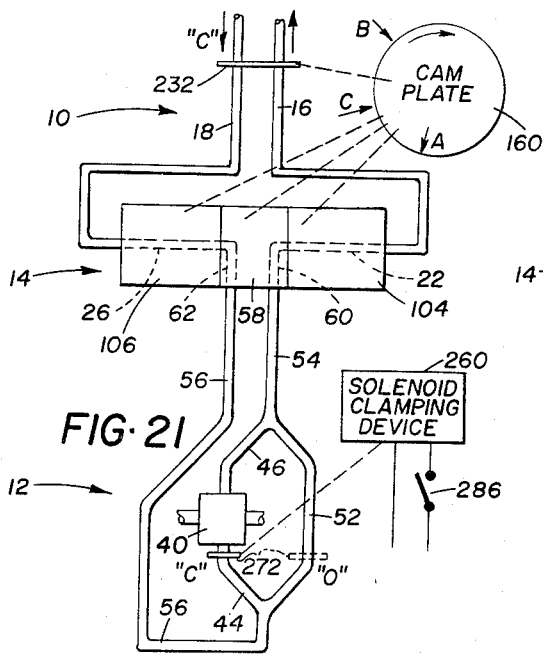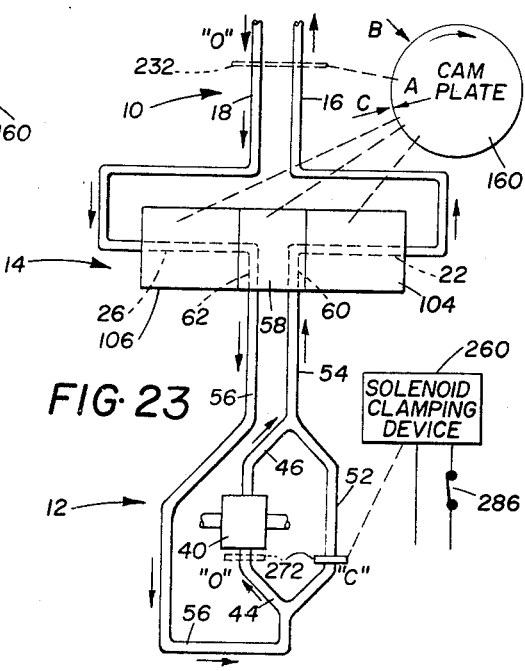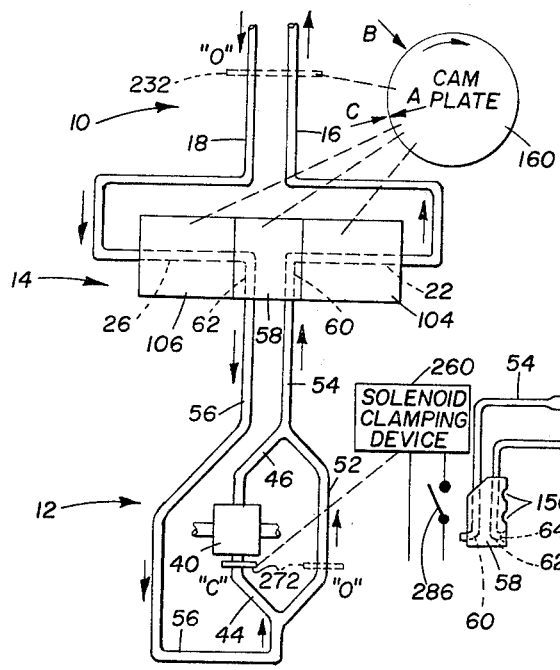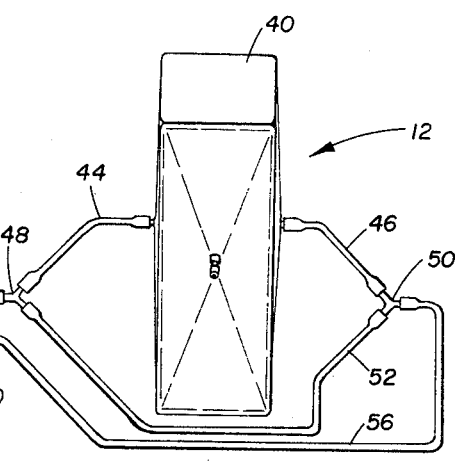

JACOB C. RUBIN
BRUNO LINGER
EDWARD J. MATTSON
INVENTORS

ATTORNEYS

United States Patent Office 3,489,146
Patented Jan. 13, 1970

3,489,146
ARTIFICIAL KIDNEY SYSTEM
Jacob C. Rubin, Bruno Linger, and Edward J. Mattson, Rochester, N.Y., assignors to Eastman Kodak Company, Rochester, N.Y., a corporation of New Jersey
Filed Jan. 12, 1967, Ser. No. 608,855
Int. Cl. A61m 5/00; F16l 19/02
U.S. Cl. 128—214
26 Claims

ABSTRACT OF THE DISCLOSURE

This application discloses an artificial kidney system comprising a shunt blood system for a patient's circulatory system, a disposable dialyzing system, and a coupling mechanism for coupling the shunt and dialyzing systems. The coupling mechanism comprises a cam operated mechanism for physically coupling and uncoupling conduits of the shunt system and dialyzing system.

---

This invention relates to dialyzing apparatus and more specifically to an improved artificial kidney system.

In use of an artificial kidney a portion of a patient's blood flow is periodically diverted through the kidney as is necessary to maintain the impurity content of the patient's blood at a desired level. With available kidney systems the periodic coupling of the kidney to the patient is a tedious and complex operation. Some of the problems rendering the operation complex include the necessity of sterilizing reused equipment and the prevention of blood clotting in the various fluid conduits and valve devices. As a result current techniques for coupling an artificial kidney to a patient require a skilled attendant to perform the coupling operation.

It is a principal object of the present invention to provide an artificial kidney system wherein an artificial kidney can be selectively coupled to and uncoupled from a patient by the patient himself without medical supervision.

Another object of the invention is to provide an improved coupling means for coupling an artificial kidney to a patient's circulatory system.

Another object of the invention is to provide a disposable dialyzing system for use in an artificial kidney system.

Another object of the invention is to render a portion of an artificial kidney system disposable after one usage and to effect substantially continuous blood flow through portions of the system which are to be reused.

Another object of the invention is to provide a shunt conduit system adapted to be permanently attached to a patient to facilitate coupling of an artificial kidney to the patient's circulatory system.

Another object of the invention is to provide an improved coupling mechanism for coupling two fluid systems.

Another object of the invention is to automatically uncouple an artificial kidney from a patient in the event of a power failure.

In the one specific embodiment of the invention disclosed a shunt conduit system is associated with the patient's circulatory system. A coupling mechanism is provided for coupling the shunt system to a dialyzing system. In accordance with one feature the dialyzing system may comprise a disposable package formed from low cost plastic materials. As a further feature fail safe means may be provided to stop the dialyzing action in the event of a power failure.

Figure 10:
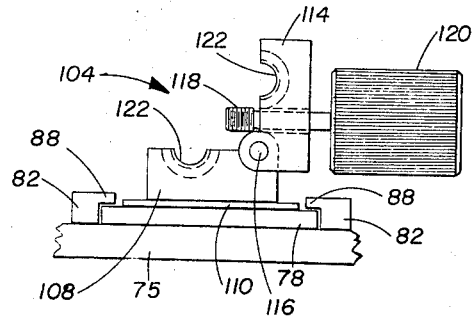
Figure 12:
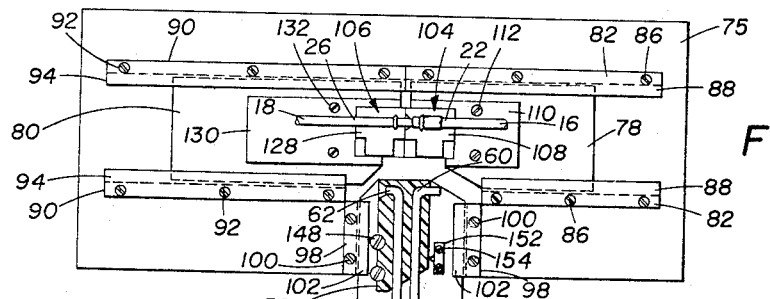
Figure 13:
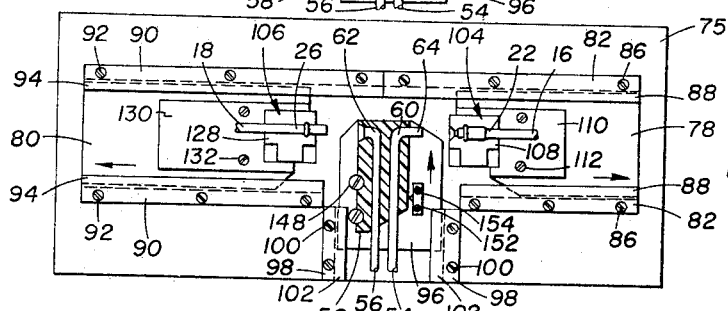
Figure 14:
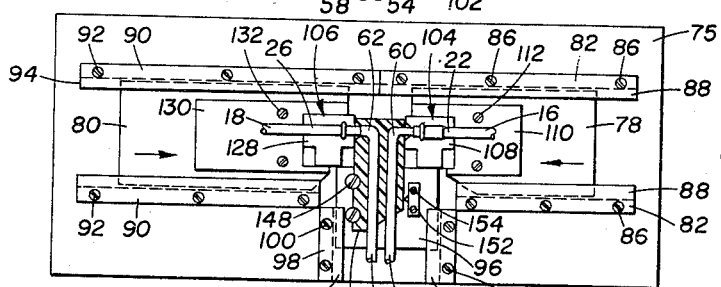
Figure 15:
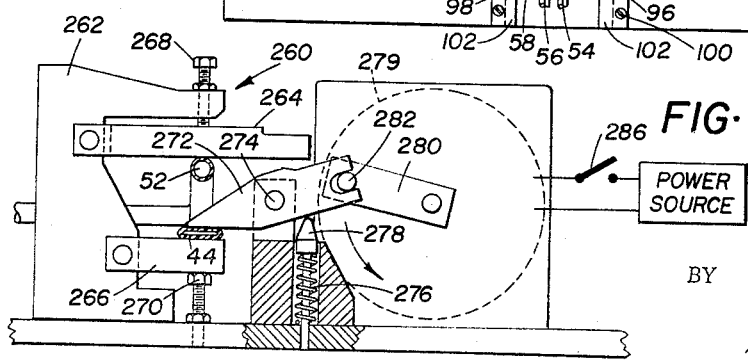
Figure 11:
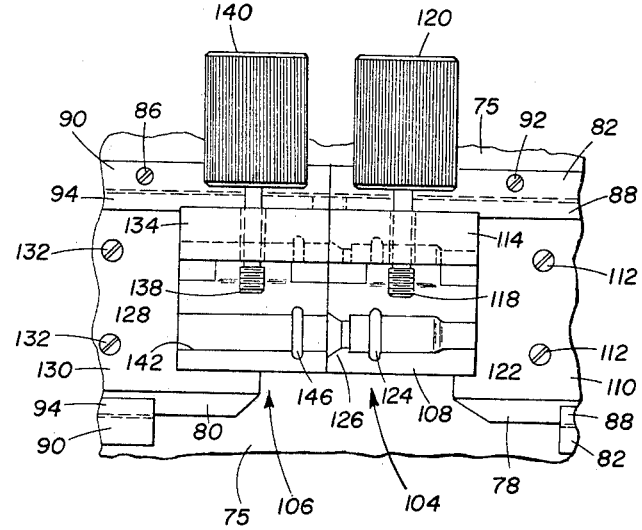
Figure 25:
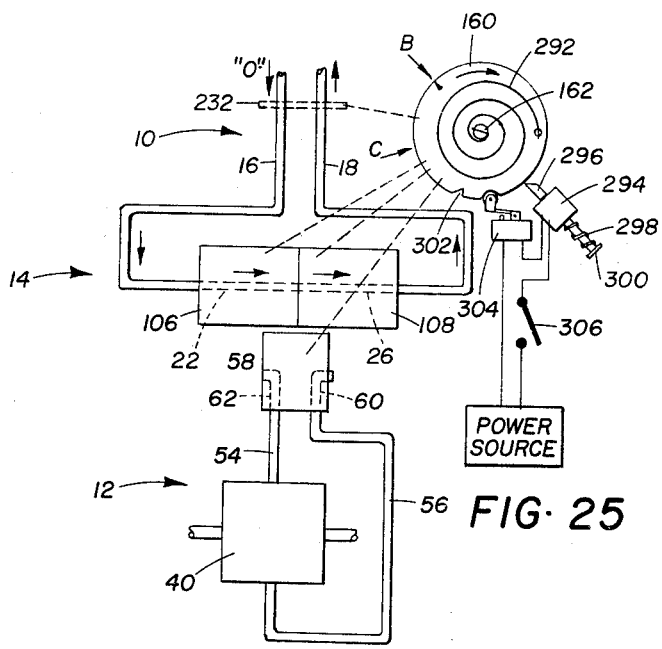

Other objects and advantages will become apparent from the following description taken in connection with the accompanying drawings wherein:

FIG. 1 is a perspective view of an artificial kidney system in accordance with the invention;
FIG. 2 is a perspective view illustrating a shunt conduit system in accordance with the invention during non-use of the kidney system;
FIG. 3 is a longitudinal sectional view of a retaining means illustrated in FIG. 2;
FIG. 4 is a view taken along the line 4—4 of FIG. 3;
FIG. 5 is a bottom view of a cam plate depicted in FIG. 1 illustrating the orientation of the parts operated thereby;
FIG. 6 is a fragmentary side view of a portion of the cam plate illustrated in FIG. 4;
FIG. 7 is a side view in partial section of the cam mechanism and manually operative means for actuating the same;
FIG. 8 is a bottom view of some of the parts shown in FIG. 7;
FIG. 9 is an enlarged view of the tube supportings means shown in FIG. 1 in one operative position thereof with the tube clamping covers removed;
FIG. 10 is a side view of a tube supporting means shown in FIG. 9;
FIG. 11 is an elongated top view of the tube supporting means shown in FIG. 1 with the tube clamping covers in an open position;
FIGS. 12, 13, and 14 are top views showing the various positions of the tube supporting means during a coupling operation;
FIG. 15 is a side view of the tube clamping means depicted in FIG. 1;
FIG. 16 is a front elevation of a kidney cartridge showing the disposable fluid conduit system associated therewith;
FIGS. 17–23 are functional schematic views illustrating the sequence of operation of the parts associated with the coupling mechanism during a coupling operation;
FIG. 24 is a bottom view of the cam plate depicted in FIG. 1 illustrating another embodiment of one portion of the disclosed embodiment of the invention;
FIG. 25 is a functional schematic view of the artificial kidney system incorporating the alternate embodiment shown in FIG. 24.

Referring to FIG. 1 of the drawings the artificial kidney system in accordance with the invention includes in general a shunt system 10 for a patient's circulatory system, a dialyzing system 12, and a coupling mechanism 14 for coupling the shunt system 10 to the dialyzing system 12 to thereby couple the patient's circulatory system to the dialyzing system.

SHUNT SYSTEM 10

Referring to FIGS. 1–4 of the drawings the shunt system 10 comprises a pair of flexible conduits or tubes 16 and 18, the ends of which may be connected to suitable surgically implanted cannulation devices (not shown) in the patient's forearm which is identified generally by the reference numeral 20. The cannulation devices (not shown) are preferably connected to the patient's vein and artery respectively and may take the form of the cannulation devices disclosed and claimed in copending application Ser. No. 608,907 filed on Jan. 12, 1967, by George Wolf and assigned to the same assignee as the present invention.

Referring specifically to FIG. 3 of the drawings the other end of the tube 16 is shaped to define an enlarged diameter end portion 22 and is provided with an annular flange 24 formed integrally with said end portion 22. The other end of the tube 18 defines an end portion 26 of the same diameter as the tube 18 and defines an annular flange 28 formed integrally with the portion 26. The end portions 22 and 26 of tubes 16 and 18 define female and male fittings respectively complemental in size, the female end portion 22 being adapted to slidably receive the male end portion 26 as indicated in FIG. 3 of the drawings.

When the end portions 22 and 26 are joined in the manner shown in FIG. 3, the flanges 24 and 28 are positioned in spaced relationship and are utilized to retain the end portions 22 and 26 in the coupled relationship depicted in FIG. 3. More specifically the flanges 24 and 28 are engaged and biased toward each other by a retaining means comprising a generally U-shaped bracket 30. The bracket 30 defines a pair of opposite legs 32 and 34 provided with slots 36 and 38 of width sufficient to receive the end portions 22 and 26 respectively but less than the diameters of flanges 24 and 28. The bracket 30 is slidably positioned on the tube end portions of 22 and 26 as shown with the surfaces of legs 32 and 34 in engagement with flanges 24 and 28 respectively. Preferably the legs 32 and 34 have a spacing slightly less than the spacing of flanges 24 and 28 when the tubes are joined so that they will engage the flanges with a slight inherent bias that tends to force the end of portion 26 into tight sealing engagement with the shoulder formed at the junction of end portion 22 with the tube 16. The patient may easily attach or remove the bracket 30 with his free hand by spreading the legs 32 and 34.

When the end portions 22 and 26 of tubes 16 and 18 are joined as shown in FIG. 3, blood will flow from the patient's artery through the tube 18 and back to the vien through tube 16. The structure thus forms a shunt system for the patient's circulatory system.

As will later be described in more detail the coupling mechanism 14 is effective to separate the tube portions 22 and 26 during a coupling operation and couple the tubes 16 and 18 to the dialyzing system 12. Prior to this operation the bracket 30 is removed by the patient and the joined tube portions 22 and 26 are placed in tube clamping blocks associated with coupling mechanism in the manner hereinafter described. When coupled to the dialyzing system tube 18 serves as a supply conduit for blood and tube 16 serves as a return conduit.

DIALYZING SYSTEM 12

Referring to FIGS. 1 and 16 of the drawings the dialyzing system 12 includes a dialyzing device or artificial kidney 40 which may take the form of the dialyzing cartridge disclosed and claimed in copending application Ser. No. 608,784, filed on Jan. 12, 1967, by John J. Meyers et al. As disclosed in this copending application the dialyzing cartridge 40 comprises a housing containing a plurality of stacked dialyzing elements (not shown). The cartridge housing is provided with inlet and outlet nipples on two opposite sides thereof which are connected to conduits or tubes 42 and 43 (FIG. 1) for the circulation of dialyzing fluid through the cartridge. The cartridge is provided with inlet and outlet nipples on the other two opposite sides thereof which are adapted to be connected to conduit means described below to form the blood dialyzing system. As described in copending application Ser. No. 608,784, one of the tubes 42 and 43 may be connected to a source of dialyzing fluid (not shown) and the other connected to waste (or back to the source if the fluid is recirculated) to circulate dialyzing fluid through the hollow interiors of the stacked dialyzing elements (not shown).

The inlet and outlet nipples for blood are connected to conduits or tubes 44 and 46 respectively for the circulation of blood through the cartridge between the dialyzing elements (not shown) in the manner disclosed in copending application Ser. No. 608,784. As shown more clearly in FIG. 16 the blood conduit system further includes a pair of Y-shaped fittings 48 and 50 connected to the ends of tubes 44 and 46 respectively and a shunt conduit or tube 52 connected between the fittings 48 and 50 in parallel with the cartridge 40. The other entrances to the fittings 48 and 50 are connected to the ends of a pair of tubes 54 and 56 respectively, the opposite ends of which are received by a coupling member or block 58. The tubes 54 and 56 define outlet and inlet conduits or tubes for the dialyzing system and are adapted to be coupled to the tubes 16 and 18 respectively in the manner hereinafter described.

As shown more clearly in FIG. 9 of the drawings the tubes 54 and 56 extend into the block 58 in spaced parallel relationship and define end portions 60 and 62 extending coaxially in opposite directions toward opposite sides of the block 58 respectively. The end portion 60 projects out of the block to define a male fitting and end portion 62 is of enlarged diameter to define a female fitting within the block 58. The end portion 62 terminates in the block 58 at the end of a conical recess 64 in the surface of the block. As will later be described in more detail the male fitting defined by end portion 60 is complemental to and adapted to be received by the female fitting defined by end portion 22 of tube 16 and the female fitting defined by end portion 62 is complemental to and adapted to receive the male fitting defined by end portion 26 of tube 18 during coupling of the shunt system 10 to the dialyzing system 12 by operation of coupling mechanism 14. The block 58 may be integrally molded from plastic material with the tube portions 60 and 62 imbedded thereon as shown. Alternatively, the block 58 may take the form of a clamping device which retains the tube portions in the positions shown in FIG. 9.

In accordance with one feature of the invention the assembly shown in FIG. 16 comprising cartridge 40, block 58, tubes 44, 46, 52, and 56 may be formed from low cost plastic materials and be disposed of after each usage of the kidney system. As will later be described in more detail, this feature renders the system usable by a patient without medical supervision since the parts forming the disposable package are the only parts in the system through which blood does not flow continuously and thus the only parts requiring sterilization and cleaning before reuse. It is accordingly preferred that this assembly be supplied as a presterilized package which will be used once by the patient and then disposed of.

The assembly comprising cartridge 40, block 58, tubes 44, 46, 52, 54 and 56 may be supplied completely filled with a liquid such as a normal saline solution which can be mixed with blood to avoid introducing air into the kidney system. As disclosed in copending application Ser. No. 608,784, the total blood capacity of the cartridge 40 may be less than 60 cc. (⅛ pint). The added fluid capacity of tubes 44, 46, 52, 54 and 56 is in the order of 48 cc. or 0.1 pint. Accordingly the total volume of saline solution introduced in the patient's blood system is negligible from a medical standpoint.

COUPLING MECHANISM 14

Referring to FIG. 1 of the drawings the disclosed embodiment of the coupling mechanism 14 comprises a main supporting frame 70 adapted to be positioned on a table top, bench, or the like where the coupling mechanism can be manipulated by the free hand of the patient. The mechanism further includes a supporting plate 72 supported by legs 74 on the frame 70 in spaced relationship with the latter whereby the patient's hand and forearm may be inserted between the surface of frame 70 and the underside of plate 72 to the position shown in FIG. 1. One edge of the plate 72 is cut away at 77 to permit the tubes 16 and 18 to be extended from the patient's wrist to the mechanism positioned on the upper surface of the plate 72 as shown. As shown in FIG. 1 a third supporting plate 75 is fixed to plate 72 in spaced relationship therewith by means of legs 76. The plate 75 supports the specific parts of the mechanism for joining the end portions of tubes 16 and 18 to the end portions of tubes 54 and 56 respectively.

Referring now to FIGS. 1 and 9–14 of the drawings a pair of aligned elongated plates 78 and 80 are slidably mounted on the surface of the supporting plate 75 for coaxial displacement in opposite directions in response to rotation of the cam means later to be described. The movable plate 78 is positioned between a pair of parallel guide bars or tracks 82 which are attached to the surface of the plate 75 by screws 86 and are provided with suitable guide flanges 88 overlying the edge portions of the plate 78 to retain the plate 78 in engagement with the surface of supporting plate 75 as shown more clearly in FIG. 10.

Similarly the plate 80 is slidably positioned between a pair of parallel guide bars or tracks 90 which are attached to the surface of the plate 75 by screws 92 and are provided with guide flanges 94 overlying the edge portions of the plate 80. The tracks 82 and 90 permit axial displacement of the plates 78 and 80 and parts supported thereon in opposite directions. As will later be described in more detail the plates 78 and 80 and the parts carried thereon are displaced between the positions indicated in FIGS. 12, 13 and 14 of the drawings by operation of the cam actuating means.

A third plate 96 is slidably positioned on the surface of plate 75 for movement in a direction perpendicular to the direction of movement of plates 78 and 80. This plate is similarly positioned between a pair of guide ribs or tracks 98 which are attached to the surface of plate 75 by screws 100 and provided with flanges 102 engaging the upper surface of the edge portions of plate 96. As will later be described the plate 96 is adapted to be displaced between the positions indicated in FIGS. 12 and 13 of the drawings in response to operation of the cam actuating means described below.

As shown in FIG. 1 and FIGS. 9–14 of the drawings a pair of tube supporting and clamping devices 104 and 106 are movably mounted on the supporting plate 75 by means of the plates 78 and 80 and associated tracks 82 and 90 respectively. In general, the devices 104 and 106 are adapted to receive the joined end portions of the tubes 16 and 18 when in the positions shown in FIGS. 1, 9 and 12 of the drawings, to separate the end portions of tubes 16 and 18 when the plates 78 and 80 are displaced to the positions shown in FIG. 13 of the drawings, and to subsequently couple the end portions of tubes 16 and 18 to the end portions of tubes 54 and 56 when displaced to the position shown in FIG. 14 of the drawings to thereby couple the dialyzing system 12 to the shunt system 10.

Referring to FIGS. 9–14 the tube clamping device 104 in the disclosed embodiment comprises a solid base 108 having a flange 110 attached to the plate 78 by screws 112. As shown in FIG. 10 a tube clamping cover 114 is hinged to the base 108 by means of a hinge pin 116. A screw 118 extending through the tube clamping cover 114 and provided with a knurled handle portion 120 is arranged to be threadedly received in the base 108 upon rotation thereof in the closed position of the cover 114 to securely lock the cover to the base 108. The base 108 and cover 114 of clamping device 104 are complementally recessed so that in the closed position of the cover the two parts define an elongated tubular opening 122 provided with a recess 124 and a conical shaped end portion 126. The opening 122 thus has dimensions generally complemental to the end portion 22 of tube 16 to receive the female fitting defined thereby with flange 24 aligned in recess 124 and the end of tube 16 positioned adjacent to the small diameter end of conical shaped portion 126 as shown in FIG. 9.

The tube clamping and supporting device 106 similarly comprises a solid base 128 having a flange 130 attached to the plate 78 by screws 132, a tube clamping cover 134 hinged to the base 128 by a hinge pin (not shown) and a screw 138 having a handle portion 140 adapted to be threadedly received in the base 128 to clamp the cover 134 to the base portion. The base 128 and cover 134 in this instance are suitably recessed to define a tubular opening 142 having an annnular recessed portion 146. The opening 142 has dimensions generally complemental to the dimensions of end portion 26 of tube 18 to receive the male fitting defined thereby in the manner shown in FIG. 9 of the drawings with the flange 28 engaging recessed portion 146 and the male end of portion 26 projecting slightly beyond the left face surface of the clamping device 106.

In operation of the clamping devices 104 and 106 as thus far described when the plates 78 and 80 are in the position shown in FIGS. 9 and 12 the bases 108 and 128 are positioned in engagement as shown. When the bases are so positioned the aligned openings 122 and 142 define a substantially continuous tubular opening having annular recesses 124 and 146 spaced complemental to the flanges 24 and 28 of the joined tube portions 22 and 26 of tubes 16 and 18. With the covers 114 and 134 open the bracket 30 may be removed from the joined tube portions 22 and 26 and the joined tube portions may be placed by the patient in the recesses of the bases 108 and 128. The covers 114 and 134 may then be closed to clamp the tube portions 22 and 26 to the bases 108 and 128 respectively. Upon subsequent displacement of the plates 78 and 80 and clamping devices 104 and 106 to the positions shown in FIG. 12 of the drawings, the tube portions 22 and 26 will be separated as shown in FIG. 13.

Referring now to the plate 96 this part is in general movable to position the tube block 58 between the clamping devices 104 and 106 when the latter are separated to effect coupling of the tubes 16 and 18 to tubes 54 and 56 respectively. As shown in FIG. 9 the plate 96 is provided with a pair of spaced screws 148 extending upwardly therefrom and adapted to be received in complemental semicircular recesses 150 (FIG. 9 and 16) formed in one side surface of the block 58. A rectangular shaped member 152 is adjustably positioned on the plate 96 by a clamping screw 154 extending through a suitable slot in member 152 and threaded in plate 96. A detent plunger 155 is slidably mounted in the member 152 and biased to the right as shown in FIG. 9 by a suitable coil spring 157. The right end of the plunger 155 is of conical configuration and adapted to engage a complemental conical shaped recess in the side of the block 58 as shown in FIG. 9 under the spring bias to retain the block 58 in a predetermined position on the plate 96. The conical shape of the plunger 155 permits the block 58 to be readily inserted between the plunger 155 and screws 148 or removed therefrom.

The cam means to be hereinafter described in detail is also effective to position the plate 96 from the position shown in FIG. 12 to the position shown in FIG. 13 when the plates 78 and 80 and clamping devices 104 and 106 are displaced to the positions shown in FIG. 13. When the parts are in the position shown in FIG. 13 the projecting male end portion 60 of the tube 54 is axially aligned with the conical recess 126 and female end portion 22 of tube 16, and female end portion 62 of tube 56 is axially aligned with the male end portion 26 of tube 18. When so positioned the plates 78 and 80 are displaced by the cam means to position clamping devices 104 and 106 into engagement with opposite sides of the block 58 as shown in FIG. 14 to position the male end portion 60 of tube 54 into the female end portion 22 of tube 16 and the male end portion 26 of tube 18 into the female end portion 62 of tube 56 to thereby couple the tubes 54 and 56 to tubes 16 and 18 respectively. The conical recesses 64 and 126 (FIG. 9) serve to guide the male fittings defined by tube portions 60 and 26 into the female fittings defined by tube portions 22 and 62 respectively and serve to compensate for slight errors in alignment.

Referring now to the cam means for positioning the plates 78, 80, and 96 and the parts supported thereby reference is made to FIGS. 1, 5, 6, 7, and 8 of the drawings. As shown in FIGS. 5 and 7 in the disclosed embodiment the cam means comprises a single rotatable circular cam plate 160 positioned below the supporting plate 75 and rotatably mounted on the upper end portion of a shaft 162 the lower end of which is fixedly supported on the supporting plate 72. The cam plate 160 is mounted on the shaft 162 by a suitable bearing assembly 166 and is freely rotatable relative to the plate 72 by the means now to be described.

Manually operable means are provided for rotating the cam plate 160 between two angular positions which will be later described in more detail. In the disclosed embodiment this means comprises a sprocket wheel 168 (FIGS. 1 and 7), fixed to a shaft 170 the lower end of which is rotatably mounted in supporting plate 72. A hand operated wheel 172 having a manual crank pin 174 is fixed to the upper end of the shaft 170 for rotating the shaft 170 and sprocket wheel 168. A drive chain 176 serves to couple the sprocket wheel 168 to sprockets 178 on the cam plate hub 180 to thereby effect rotative movement of the cam plate 160 in response to manual rotation of the wheel 172.

Referring specifically to FIG. 8 of the drawings the manually operative means further includes stop means for determining the range of movement of wheel 172 and cam plate 160. More specifically a circular plate 182 is fixed to the end of shaft 170 below the supporting plate 72 and defines an integrally formed abutment 184 adapted to selectively engage a pair of adjustable stop members 186 and 188 fixed to the lower side of plate 72 by screws 190 and 192 which extend through suitable slots in said members.

In the position of the plate 182 shown in FIG. 8 the abutment 184 engages the stop 186 which defines a first position of the wheel 172 and cam plate 160 wherein the dialyzing system 12 is uncoupled from the shunt system 10. If the wheel 172 is displaced counterclockwise as viewed in FIG. 1 the plate 182 and cam plate 160 will be angularly displaced to a second position wherein abutment 184 engages stop 188 and wherein the two fluid systems 10 and 12 are coupled together.

The manually operative means for actuating the cam plate 160 further includes an overcenter biasing means for insuring positive displacement of the parts between the two positions described above. More particularly as shown in FIG. 8, a coil spring 194 is mounted in tension between a pin 196 fixed to the underside of the plate 72 and a pin 198 fixed to the abutment 184 to bias the circular plate 182 and cam plate 160 toward one of the two angular positions when in an overcenter position. In the position of the parts shown in FIG. 8 the spring 194 biases the circular plate 182 to the first angular position thereof wherein the abutment 184 engages stop 186. If the circular plate 182 is rotated by manual manipulation of wheel 172 the plate 182 will rotate against the bias of the spring 194 until the spring axis is aligned with a line between pin 196 and shaft 170. Further displacement of the plate 182 will move the spring 194 over center causing the latter to bias the plate 182 toward the second angular position thereof wherein abutment 184 engages stop 188. The spring 194 is thus effective to bias the plate 182 and cam plate 160 to either the first or second position thereof. Preferably the spring is provided with sufficient tension to displace cam plate 160 through the drive mechanism when over center to insure rapid displacement of the parts between the first and second positions thereof. The specific advantages of this feature will become more fully apparent from the subsequent description.

Referring now specifically to FIG. 5 of the drawings the manually operative means described above is effective to displace the cam plate 160 between first and second angular positions in which the shunt system 10 and dialyzing system 12 are uncoupled and coupled respectively. In the uncoupled position shown radial reference line A is aligned with reference line B whereas in the coupled position radial reference line A is aligned with reference line C, the cam plate 160 being rotatable between the two positions in the direction indicated by the arrow.

The cam plate 160 defines a first actuating surface for positioning plate 78 in tracks 82 comprising a groove 200 in the upper face surface thereof. The groove 200 is engaged by a roller 202 rotatably mounted on the end of a follower pin 204 fixed to and extending from the lower surface of plate 78 through a slot 206 in the supporting plate 75. When the cam plate 160 is angularly displaced between positions B and C pin 204 will be displaced by groove 200 to position the plate 78 and assembly carried thereby from the position shown in FIG. 12 to the position shown in FIG. 13 and then to the position shown in FIG. 14, the latter position corresponding to position C of the cam plate 160.

The cam plate 160 defines a second actuating surface for positioning plate 80 in tracks 90 comprising a groove 208 in the lower face surface thereof. The groove 208 is engaged by a roller 210 rotatably mounted on a pin 212 carried by a bracket 214. The bracket 214 extends from the lower surface of plate 90 through an opening 216 in the supporting plate 75 and around the edge of cam plate 160 to support the pin 212 and roller 210 below the cam plate 160. When the cam plate 160 is angularly displaced between positions B and C pin 212 will be displaced to position plate 80 and the parts carried thereby from the position shown in FIG. 12 to the position shown in FIG. 13 and then to the position shown in FIG. 14, the latter position corresponding to position C of cam plate 160.

The cam plate 160 further defines a third actuating surface for positioning the plate 96 in tracks 98. This surface comprises a groove 218 in the upper surface of cam plate 160 engaged by a roller 220 rotatably mounted on the end of a follower pin 222 extending from the lower surface of plate 96 through a slot 224 in supporting plate 75. When the cam plate 160 is angularly displaced between positions B and C the pin 222 will be displaced in slot 224 to position plate 96 and the parts carried thereby from the position shown in FIG. 12 to the position shown in FIG. 13.

Referring now to the specific movements of plates 78, 80, and 96, during the coupling operation plates 78 and 80 are displaced simultaneously in synchronism through the range of positions described, and plate 96 is displaced when the plates 78 and 80 and parts carried thereby are displaced from the positions shown in FIG. 12 to the separated positions shown in FIG. 13. More specifically (referring to FIG. 24) the grooves 200 and 208 of cam plate 160 have first varying radius sections $a$ which initially effect displacement of the plates 78 and 80 and the parts carried thereby from the positions shown in FIG. 13 to the positions shown in FIG. 14, second varying radius sections $b$ 200 which displace the plates 78 and 80 and parts carried thereby from the separated positions shown in FIG. 13 to the positions shown in FIG. 14, and constant radius portions intermediate portions $a$ and $b$ which cause the plates 78 and 80 to dwell in the separated positions shown in FIG. 13 for a predetermined time between the separating and return movements.

Groove 218 in contrast to grooves 200 and 208 is provided with constant radius portions $d$ and $e$ connected by a portion $f$ of varying radius. The different portions of the grooves 200, 208 and 218 are oriented such that when the plates 78 and 80 are momentarily stationary in the position shown in FIG. 13, plate 96 is displaced from the position shown in FIG. 12 to the position shown in FIG. 13.

To summarize the sequence of movement of the parts thus far described during the coupling operation, when cam plate 160 is rotated from position B to position C by manual manipulation of wheel 172, plates 78 and 80 will be initially displaced from the positions shown in FIG. 12 to the positions shown in FIG. 13 by varying radius sections $a$ of grooves 200 and 208 respectively to separate the end portions 22 and 26 of tubes 16 and 18. Plates 78 and 80 will remain stationary in the positions shown in FIG. 13 for a predetermined time during which plate 96 will be displaced from the position shown in FIG. 12 to the position shown in FIG. 13 by section $f$ of groove 218 to position the block 58 between the clamping devices 104 and 106 carried by plates 78 and 80. Subsequently plates 78 and 80 will be displaced to the positions shown in FIG. 14 by sections $b$ of grooves 200 and 208 to urge the clamping devices 104 and 106 carried by plates 78 and 80 against the block 58 to join tube portions 26 and 62 and tube portions 22 and 60 as shown in FIG. 13 to thereby couple the shunt system 10 to the dialyzing system 12. It will be apparent that displacement of the cam plate 160 from position C to position B by manual manipulation of wheel 172 will reverse the above movements to uncouple the shunt system 10 and dialyzing system 12.

Means are also provided for clamping the tubes 16 and 18 prior to the sequence of movements described above to prevent loss of blood from the patent while the two systems are being coupled or uncoupled. Referring specifically to FIG. 1, two pairs of spaced guide pins 226 and 228 are fixed to the edge portion of pate 72 adjacent to the edge of the cutaway section 77 thereof to align the tubes 16 and 18 respectively in spaced relationship as shown. A shield 230 extending from the plate 72 to the plate 75 prevents contact of the tubes 16 and 18 with the cam plate 160 and chain 176. A clamping bar 232 is pivotally mounted at one end thereof by means of a suitable bracket and pin assembly 234 and defines a tube clamping portion 235 overlying the tubes 16 and 18 as shown in FIG. 1. The actuating means for bar 232 comprises a pivotal lever 236 having one end pivotally mounted on supporting plate 72 by means of a bracket and pin assembly 238 and the other end thereof extending through a notch 239 in clamping bar 232 to the edge of the cam plate 160. Referring to FIG. 5 a roller 240 is rotatably mounted on the free end of lever 236 by a pin 241 and is positioned to be engaged by two spaced recesses 242 and 244 in the lower surface of the cam plate 160 in positions B and C of the cam plate 160 respectively and to be engaged by the surface of the plate 160 between recesses 242 and 244 during rotation of cam plate 160 between said positions. To complete the assembly a wire spring 246 (FIG. 1) supported by a bracket and pin assembly 248 has a movable portion engaging the clamping bar 232. The spring 246 is effective to urge the clamping bar 232 upward into engagement with the lever 236 and to urge the lever 236 upward to effect engagement of the roller 240 with the surface of cam plate 160 to effect positioning of the lever 236 by the cam plate 160.

In operation of the tube clamping means when roller 240 is engaged by one of the two recesses 242 and 244 the spring 246 will urge the clamping bar 232 to its uppermost position wherein the tubes 16 and 18 are unclamped. When the cam plate 160 is in position B roller 240 engages recess 242. Rotation of the cam plate 160 will cause the shoulder of the recess 242 to displace lever 236 and clamping bar 232 downward to position the clamping bar 232 into clamping engagement with the tubes 16 and 18. The flat surface of the cam plate 160 will retain the parts in the clamping positions thereof until cam plate 160 reaches position C at the end of the coupling operation. In position C of the cam plate 160 the roller 240 will engage recess 244 and clamping bar 232 and lever 236 will be displaced to the position shown in FIG. 1 by the lever of spring 246. The same sequence of operation will occur during return movement of cam plate 160 to position B.

The tube clamping means is thus responsive to initial movement of cam plate 160 during a coupling operation or an uncoupling operation to clamp the tubes 16 and 18 which remain clamped until the operation is complete. This feature prevents blood flow in the shunt system 10 during the coupling or uncoupling operation when the tube portions 22 and 26 are separated.

In additional to the tube clamping means defined by clamping bar 232 and associated parts electrically operative clamping means may be optionally provided for selectively effecting flow of blood through the tube 56 and cartridge 40. Referring to FIGS. 1 and 15, this means comprises a solenoid operated device 260 for selectively clamping tubes 44 and 52 (FIG. 15). The device 260 includes a frame 262 for supporting a pair of adjustable spaced arms 264 and 266, each of which are pivotally mounted at one end on the frame 262. Screws 268 and 270 and associated lock nuts are provided for calibrating the positions of arms 264 and 266 respectively.

The tubes 44 and 52 are positioned in contact with the juxtaposed surfaces of the arms 264 and 266 respectively by suitable guides (not shown) and on opposite sides of a pivotal clamping lever 272, the left end (as viewed in FIG. 15) of which is wedge shaped to define upper and lower clamping surfaces for engaging the tubes 44 and 52 respectively. The clamping lever 272 is pivotally mounted on a pin 274 in turn supported on a portion of the frame 262 and is biased by a spring 276 and plunger 278 counterclockwise as viewed in FIG. 15 toward the position shown wherein the left end engages and clamps tube 44 to prevent fluid flow therethrough. A rotary solenoid 279 having an actuating lever 280 is operatively connected to the end of clamping lever 272 to angularly displace the same clockwise as viewed in FIG. 15 against the bias of spring 276 into clamping engagement with the tube 52. Rotary motion of the actuating lever 280 is transmitted to the clamping lever by a pin 282 carried in the end of lever 280 and engaging a slot in the end of clamping lever 272.

When the solenoid 279 is de-energized clamping lever 272 will engage and clamp tube 44 as shown to prevent the flow of fluid through tube 44 and thus the flow of blood through the artificial kidney 40. In this condition of the solenoid, tube 52 will be unclamped to establish a shunt flow of blood around the cartridge 40. When the solenoid 279 is energized the shunt tube 52 will be clamped and tube 44 will be unclamped to establish blood flow through the cartridge 40. To avoid clotting of blood in tube 52 the clamping action is preferably adjusted to permit a trickle flow through the tube 52 when the latter is clamped.

As indicated schematically in FIG. 15 the solenoid 279 may be connected in series with a manually operative switch 286 and a power source by suitable electrical conductors. As shown in FIG. 1 switch 286 may take the form of a toggle switch mounted on the solenoid housing.

The electrically operable tube clamping means thus provides a means for effectively coupling and uncoupling the cartridge 40 from the system when the shunt system 10 is physically coupled to the dialyzing system 12. The clamping means also provides a fail safe feature in that the cartridge 40 is effectively uncoupled from the system in the de-energized condition of solenoid 279. This feature is important in the case of a power failure when pumps (not shown) for circulating dialyzant through the cartridge may not be functioning.

It will be apparent that if the electrically operative tube clamping means are not provided or utilized the disposible package depicted in FIG. 15 can be simplified by the omission of tubes 52, 44, and 46 and fittings 48 and 50 whereupon the ends of tubes 54 and 56 may be coupled directly to the cartridge 40. The cost of the disposable dialyzing system is thus slightly less if this feature is not utilized.

OPERATION

When the artificial kidney system is not in use the shunt system 10 is carried by the patient's body in the manner shown in FIG. 2 of the drawings, the bracket 30 serving to securely retain the female and male end portions of the tubes 16 and 18 in the coupled condition depicted in FIG. 3. The patient thus may move freely about and engage in normal activities.

When dialysis of the blood is required the patient may first check to make sure that the wheel 172 is positioned in the uncoupled condition of the coupling mechanism 14 wherein cam plate 160 is in position B. The patient may next ready the dialyzing system 12 for coupling to the shunt system 10 by coupling tubes 42 and 43 to the appropriate inlet and outlet nipples of the cartridge 40 positioning tubes 44 and 52 in the solenoid clamping device 260, and positioning the tube block 58 on movable supporting plate 96.

The patient next inserts his arm between the frame 70 and plate 72 of the coupling mechanism 14 to the position shown in FIG. 1 of the drawings and positions the shunt system tubes 16 and 18 between the guide pins 226 and 228 and under the clamping bar 232. He may then open the covers of tube clamping devices 106 and 108, remove the bracket 30 from the tube portions 22 and 26, and position the tube portions in the recesses of the base portions of the clamping devices 104 and 106 in the manner shown in FIG. 12 of the drawings. The covers of tube clamping devices 104 and 106 are then closed and knobs 120 and 140 rotated to securely clamp the tube portions 22 and 26 in devices 104 and 106. The two systems 10 and 12 are then ready to be coupled by operation of coupling mechanism 14.

Figure 17:
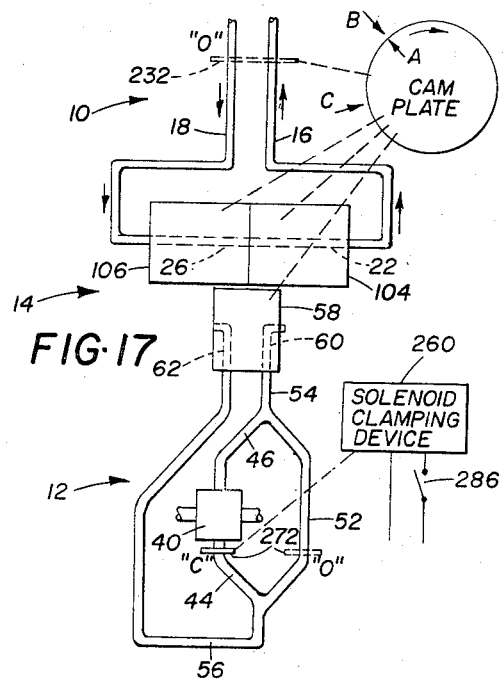

FIGS. 17–23 of the drawings illustrate the sequence of operation and movements of the parts during the coupling operation. FIG. 17 illustrates the initial condition of the apparatus after the patient has performed the preliminary steps described above. It will be observed that cam plate 160 is in position B, clamping bar 232 is out of engagement with the tubes 16 and 18 as indicated by the open symbol O, tube clamping device 104 and 106 are positioned in engagement with tube portions 22 and 26 inserted by the patient and switch 286 is open causing solenoid clamping device 260 to clamp tube 44 as indicated by the closed symbol C and unclamp tube 52 as indicated by the open symbol O.

Figure 18:
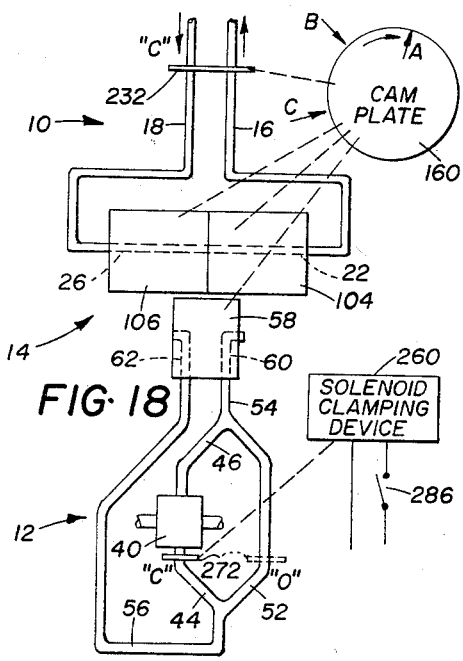
Figure 19:
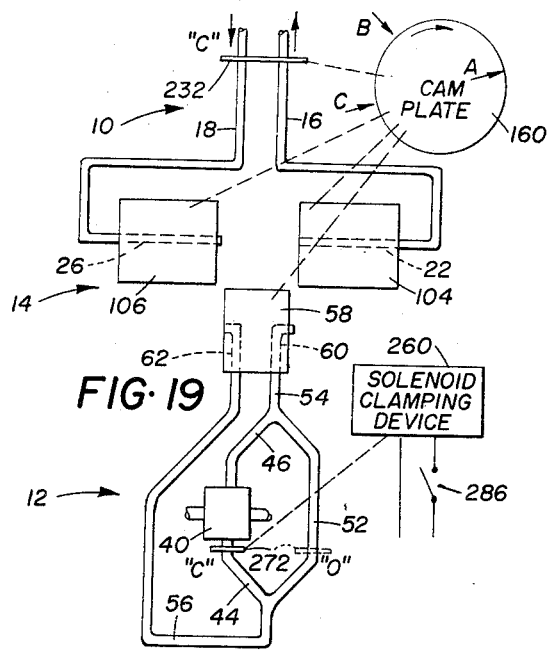
Figure 20:
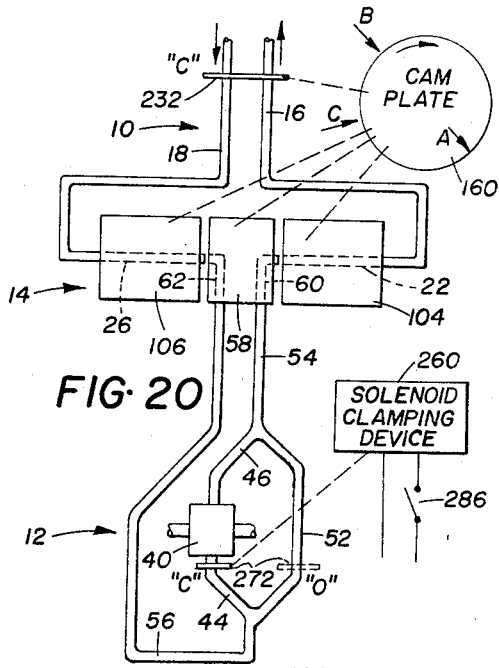

To couple the shunt system 10 and dialyzing system 12 the patient rotates wheel 172 (FIG. 1) with his free hand to angularly displace the cam plate 160 toward position C thereof in the manner hereinbefore described. Initial movement of the cam plate 160 actuates clamping bar 232 to clamp shunt lines 16 and 18 as indicated in FIG. 18 and thus terminate the flow of blood in the shunt system 10. Further movement of the cam plate 160 will cause separation of the tube clamping devices 104 and 106 and separation of the tube portions 22 and 26 as indicated in FIG. 19, the tubes 16 and 18 remaining clamped as indicated to prevent blood flow from the tube ends. When the cam plate 160 is rotated further it will displace the block 58 to a position between the separated clamping devices 104 and 106 as shown in FIG. 20 wherein tube portions 60 and 62 are positioned in alignment with tube portions 22 and 26. Further rotation will position the tube clamping devices 104 and 106 into engagement with block 58 as shown in FIG. 21 to join tube portions 26 and 62 and join tube portions 22 and 60 to thereby couple the tubes 16 and 18 to tubes 54 and 56. When the cam plate 160 reaches position C the clamping bar 232 will be released to open tubes 16 and 18 as indicated by the open symbol O in FIG. 22.

With the cam plate 160 in position C and solenoid device 260 still de-energized as indicated in FIG. 22 blood will flow from the patient's artery through tube 18, tube 56, tube 52, tube 54 and tube 16 back to the vein, the flow being shunted around cartridge 40. To commence the dialyzing operation the patient may now close switch 286 and energize solenoid clamping device 260 which unclamps tube 44 and clamps tube 52 as indicated in FIG. 23 to effect blood flow through the cartridge 40.

After the required period of dialysis the patient may readily uncouple the shunt system 10 and dialyzing system 12 by first opening switch 286 and then rotating wheel 172 to return cam plate 160 to position B. During such movement the above described sequence of movements will occur in reverse order to position the parts as shown in FIG. 17. The patient may then remove the joined tube portions from clamping devices 104 and 106 and install bracket 30 thereon whereupon he may leave the apparatus. The dialyzing system 12 is then preferably disposed of.

It will be apparent that if a power failure occurs during the dialyzing operation solenoid clamping device 260 will unclamp tube 52 and clamp tube 44 to shunt the blood flow around the cartridge 40 to thereby terminate the dialyzing operation. It will also be apparent that solenoid clamping device 260 can be readily omitted to simplify the dialyzing system in the manner hereinbefore described. The fail safe feature is preferred in the case of very aged patients or patients in extremely poor physical condition since such patients may not have sufficient awareness to detect a power failure condition. In the case of conscious patients having normal physical strength the solenoid clamping device 260 may be readily omitted or need not be used if provided. In the latter case the more simple dialyzing system previously described omitting the cartridge shunt can be utilized.

The disclosed coupling mechanism provides for positive accurate coupling of the shunt system 10 to the dialyzing system 12 with minimum effort on the part of the patient. The one-piece cam plate providing all of the cam actuating surfaces insures exact synchronism of the movable parts during the coupling and uncoupling operations. Because of its configuration, the cam plate 160 can be accurately molded from low cost plastic material and accordingly reliability can be achieved with minimum cost.

It will be noted that the tubes 16 and 18 forming the shunt system 10 are subjected to continuous blood flow during use and non-use of the kidney system and accordingly are not subject to blood clotting therein. Moreover the end portions of the tubes 16 and 18 are exposed to the atmosphere for only an instant during the coupling and uncoupling operation. Accordingly, the useful life of shunt system 10 is greatly increased by eliminating the need for manual manipulation with attendant dangers of bacterial contamination, even without medical supervision.

One of the most important features of the invention is the location of all tubes and parts subjected only to periodic blood flow in the disposable dialyzing system 12. By rendering the system 12 disposable we have eliminated cleaning and sterilization problems attendant to such periodic use since the dialyzing system 12 is disposed of after each periodic usage of the system. This feature renders the disclosed artificial kidney system suitable for use in the home without medical supervision.

ALTERNATE FAIL SAFE FEATURE—FIGS. 24–25

Referring to FIGS. 24–25 of the drawings there is shown an alternate embodiment of a portion of the coupling mechanism which also provides a fail safe feature. In this embodiment the cam plate 160 is biased to position B thereof by a biasing means comprising a coil spring 292 which encircles the shaft below the cam plate and has one end fixed to the cam plate 160 and the other end thereof anchored to the shaft 162 as indicated schematically in FIG. 24. The spring 292 is provided with sufficient tension such that in position C of the cam plate 160 it can overcome the other forces in the system and rotate cam plate 160 to position B to uncouple the shunt system 10 and dialyzing system 12.

Means are provided for latching the cam plate 160 in position C thereof against the bias of spring 292. This means comprises a solenoid 294 having a plunger 296 movable axially relative to the cam plate 160 and biased to the position shown by a spring 298 mounted in compression between the solenoid 294 and a flange 300 on the end of the plunger. When the solenoid 294 is energized plunger 296 will be displaced axially into engagement with the edge of the cam plate 160 against the bias of spring 298.

The latching means further includes a recess 302 in the edge of the cam plate 160 adapted to be aligned with and engaged by the end of plunger 296 when the cam plate is in position C. When the end of the solenoid plunger 296 engages the recess 302 it will latch the cam plate in position C and retain the same in said position against the bias of spring 298.

To control energization of the solenoid 294 a switch means comprising microswitch 304 and a manually operative switch 306 are connected in series with the solenoid across a power source as indicated schematically in FIG. 24. The microswitch 304 has a pair of normally open switch contacts now shown arranged to be closed by the axial displacement of an actuating pin 308. The pin 308 is adapted to be displaced by an actuating lever 310 pivoted at one end on the switch housing and provided with a roller follower 312 on the other end thereof adapted to engage a recess 314 in the edge of the cam plate 160 in position B of the cam plate 160 as shown in FIG. 24. When the roller follower 312 engages the recess 314 the switch contacts of switch 304 will be open and solenoid 294 will be de-energized. If the cam plate 160 is displaced toward position C thereof the follower 312 will be displaced toward the switch 304 to actuate pin 308 and close the switch contacts.

In operation of the structure shown in FIGS. 24 and 25, in the uncoupled condition of shunt system 10 and dialyzing system 12 follower 312 will engage recess 314 as shown in FIGS. 24 and 25 and solenoid 294 will be de-energized. If it is desired to couple the shunt system 10 to the dialyzing system 12 the patient first closes switch 306 and then rotates wheel 172 to displace the cam plate 160 to position C thereof. As the cam plate begins to rotate follower 312 will be displaced by the edge of recess 314 to close the contacts of switch 304 and energize solenoid 294 causing engagement of plunger 296 with the edge of cam plate 160. When the cam plate 160 reaches position C plunger 296 will engage recess 302 and latch the plate 160 in said position against the bias of spring 292.

If a power failure should occur while cam plate 160 is latched in position C of solenoid 294 spring 298 will displace plunger 296 to retract the same from recess 302 whereupon spring 292 will return cam plate 160 to position B to uncouple the shunt system 10 and dialyzing system 12. Thus the system automatically functions to uncouple the shunt system and dialyzing system to terminate the dialyzing operation.

With the alternate embodiment disclosed in FIGS. 24 and 25 the patient may also uncouple the two systems at any time by opening switch 306. This operation will de-energize the solenoid 294 and effect retaining the cam plate 160 to the uncoupled position thereof. This feature is advantageous in that it permits the patient to immediately uncouple the system in the event of a malfunction, e.g., blood or dialyzant leak.

As will be apparent from FIG. 25 the dialyzing system 12 and the disposable portion of the system may be simplified when this alternate feature of the invention is utilized in that tubes 54 and 56 may be connected directly to the cartridge to eliminate the Y-fittings and other connecting tubes shown in FIG. 15.

We claim:
1. In a coupling apparatus for coupling a first conduit system defining male and female fittings to a second conduit system defining female and male fittings, the combination comprising:
   first and second means for supporting the male and female fittings defined by the first conduit system respectively in joined relationship;
   third means for supporting the female and male fittings defined by the second conduit system; and
   means for displacing said first and second means to separate the male and female fittings defined by the first conduit system, displacing said third means to position the female and male fittings defined by the second conduit system into coupling alignment with the male and female fittings of the first conduit system, and displacing said first and second means to join the male and female fittings defined by the first conduit system to the female and male fittings defined by the second conduit system.

2. In a coupling apparatus for coupling a first pair of tubes of a first fluid system to a second pair of tubes of a second fluid system, the combination comprising:
   first and second movable means having first positions for supporting the end portions of the first pair of tubes in joined relationship and second positions for supporting the end portions of the first pair of tubes in separated relationship;
   third movable means for supporting the end portions of the second pair of tubes; and
   cam means for displacing said first and second movable means from said first to said second positions thereof, then displacing said third movable means to position the end portions of the second pair of tubes in aligned relationship with the end portions of the first pair of tubes and then for displacing said first and second movable means toward said first positions thereof to join the end portions of the first pair of tubes to the end portions of the second pair of tubes.

3. In a fluid system, the combination comprising:
   first conduit means defining male and female fittings joined together;
   first means movably supporting said male fitting defined by said first conduit means;
   second means movably supporting said female fitting defined by said first conduit means;
   second fluid conduit means defining female and male fittings;
   third means movably supporting said female and male fittings defined by said second conduit means;
   cam means movable from a first position to a second position for displacing said first and second means to separate the joined male and female fittings of said first conduit means, then positioning said third means to align the female and male fittings defined by said second conduit means with said male and female fittings defined by said first conduit means, and then displacing said first and second supporting means to join said male and female fittings of said first conduit means to said female and male fittings of said second conduit means.

4. In a fluid system as claimed in claim 3 further including means for biasing said cam means to said first position; and
   means for latching said cam means in said second position.

5. In a fluid system as claimed in claim 3 further including means for biasing said cam means to said first position thereof; and
   electrically operative means for latching said cam means in said second position thereof.

6. In a fluid system as claimed in claim 3 further including overcenter spring means for biasing said cam means to said first and second positions thereof.

7. In a fluid system as claimed in claim 3 wherein said first conduit means comprises a pair of flexible tubes having end portions defining said male and female fittings respectively; and wherein said second conduit means includes a member defining female and male fittings on opposite sides thereof, said cam means being effective to position said member between said male and female fittings of said first conduit means.

8. In a fluid system as claimed in claim 3 wherein said second conduit means comprises a pair of flexible tubes, defining said female and male fittings, said member supporting said tubes.

9. In a fluid system as claimed in claim 3 wherein said first conduit means comprises a pair of flexible plastic tubes and further including means actuated by said cam means for clamping said flexible tubes during movement of said cam means from said first position to said second position.

10. In a dialyzing system, the combination comprising:
a dialyzing device;
inlet and outlet tubes each having one end thereof connected to said dialyzing device;
a tube supporting member for supporting the other ends of said inlet and outlet tubes with said other ends extending in opposite directions and in coaxial relationship;
means movably supporting said member for movement between first and second positions;
supply and return tubes each having one end connected to a source of fluid to be dialyzed;
a first tube supporting device for supporting the other end of said supply tube;
a second tube supporting device for supporting the other end of said return tube;
means movably supporting said first tube supporting device for movement between first and second positions;
means movably supporting said second tube supporting device for movement between first and second positions;
said first and second tube supporting devices supporting their respective tube ends in coaxial joined relationship in said first position thereof and in spaced coaxial relationship in said second position thereof; and
cam means for displacing said first and second tube supporting devices from said first to said second positions thereof and for displacing said tube supporting member from said first to said second positions thereof and then displacing said first and second tube clamps from said second position toward said first position thereof until the ends of said inlet and outlet tubes are joined to the ends of said supply and return tubes respectively.

11. In an artificial kidney system including a pair of flexible tubes for blood adapted to be connected to a patient's circulatory system and a pair of flexible tubes extending from a dialyzing device, the combination comprising:
cam means movable through a range of positions for sequentially clamping the first pair of tubes to prevent the flow of blood therethrough, coupling the first pair of tubes to the second pair of tubes to couple the patient's circulatory system to the dialyzing device and unclamping the first pair of tubes; and
means for moving said cam means through said positions.

12. In an artificial kidney system including a first pair of flexible tubes for blood adapted to be connected to a patient's circulatory system and a second pair of flexible tubes extending from a dialyzing device;
male and female fittings associated with the ends of the first pair of tubes respectively adapted to be joined together;
female and male fittings associated with the ends of the second pair of tubes respectively adapted to be joined together;
first and second movable means supporting said male and female fittings associated with the first pair of tubes respectively in joined relationship;
third movable means supporting said female and male fittings associated with the second pair of tubes;
means operative to control the flow of blood in the first pair of tubes; and
cam means movable from a first position to a second position for sequentially operating said blood flow controlling means to prevent the flow of blood in the first pair of tubes, displacing said first and second movable means to separate said male and female fittings supported thereby, positioning said third movable means between said first and second movable means to align the female and male fittings supported thereby with said male and female fittings associated with the first pair of tubes respectively, positioning said first and second movable means to join the male and female fittings associated with the first pair of tubes with said female and male fittings associated with the second pair of tubes, and operating said blood flow controlling means to permit the flow of blood in the first pair of tubes.

13. In an artificial kidney system as claimed in claim 12 wherein said cam means comprises a cam plate rotatably mounted for movement between said first and second positions and defining a plurality of surfaces for sequentially operating stid blood flow controlling means, said first movable means, said second movable means and said third movable means respectively.

14. In an artificial kidney system as claimed in claim 13 further including a manually rotatable shaft drivingly coupled to said cam plate;
a plate fixed to said shaft and defining an abutment;
spaced stops selective engaged by said abutment to define said first and second positions of said cam plate; and
overcenter spring means for selectively biasing said plate toward said first and second positions of said cam plate.

15. In an artificial kidney system for dialyzing the blood of a patient, the combination comprising:
a first pair of flexible tubes having ends adapted to be connected to the patient's circulator system and having opposite ends adapted to be coupled to define a shunt blood system for the patient's circulatory system;
a dialyzing device having an inlet and outlet for blood;
a second pair of tubes having ends adapted to be coupled to the inlet and outlet of the dialyzing device respectively and having opposite ends adapted to be coupled to said opposite ends of said first pair of tubes respectively to couple the dialyzing device to said shunt blood system;
means for sequentially clamping said first pair of tubes to terminate blood flow therethrough, uncoupling said opposite ends of said first pair of tubes positioning said opposite ends of said second pair of tubes into coupling alignment with said opposite ends of said first pair of tubes, coupling said opposite ends of said first pair of tubes to said opposite ends of said second pair of tubes, and unclamping said first pair of tubes.

16. In an artificial kidney system as claimed in claim 15 wherein said dialyzing device and said second pair of tubes comprises a disposable assembly formed from plastic materials.

17. In an artificial kidney system including a pair of flexible tubes for blood adapted to be connected to a patient's circulatory system and a pair of flexible tubes extending from a dialyzing device, the combination comprising:

male and female fittings associated with the ends of the first pair of tubes respectively adapted to be selectively coupled and uncoupled with respect to each other;

a frame;

first and second means for movably supporting said male and female fittings on said frame respectively, said first and second means having first positions for supporting said male and female fittings in coupled relationship and second positions for supporting said male and female fittings in spaced uncoupled relationship;

a coupling member associated with the ends of the second pair of tubes and defining female and male fittings communicating with the second pair of tubes respectively;

third means for movably supporting said coupling member on said frame for movement into and out of coupling alignment with said male and female fittings of the first tubes when the latter said fittings are uncoupled;

means operative to selectively clamp and unclamp the first pair of tubes to prevent the flow of blood therethrough; and cam means movable from a first position to a second position for sequentially operating said clamping means to clamp the first pair of tubes, moving said first and second means from said first positions to said second positions therefor, moving said third means to position said coupling member into coupling alignment with said male and female fittings of the first pair of tubes, moving said first and second means toward said first positions thereof to couple said male and female fittings supported thereby to said female and male fittings defined by said coupling member respectively, and operating said clamping means to unclamp the first pair of tubes.

18. In an artificial kidney system as claimed in claim 17 further including means for biasing said cam means to said first position thereof; and electrically operative means operative when energized to latch said cam means in said second position thereof.

19. In an artificial kidney system as claimed in claim 18 wherein said cam means comprises an integral part defining said surfaces.

20. In an artificial kidney system including a first pair of flexible tubes for blood adapted to be connected to a patient's circulatory system and a second pair of flexible tubes extending from a dialyzing device, the combination comprising:

a pair of fittings associated with the ends of the first pair of tubes respectively and adapted to be coupled together;

a frame;

first and second means for movably supporting said fittings respectively on said frame;

a coupling member associated with the ends of said second pair of tubes and adapted to be coupled to said fittings;

third means for movably supporting said coupling member on said frame; and a movable cam plate defining a plurality of cam surfaces for sequentially displacing said first and second means to uncouple said fittings and displacing said first, second, and third means for coupling said coupling member to said fittings to thereby couple the patient's circulatory system to the dialyzing device.

21. In an artificial kidney system as claimed in claim 20 wherein said first and second means each comprise:

a plate slidably mounted on said frame and operatively connected to one of said cam surfaces; and a clamping device fixed to said plate for receiving and supporting the respective fitting.

22. In an artificial kidney system as claimed in claim 21 wherein each of said clamping devices comprises a base fixed to said plate; and a cover hinged to said base for clamping the respective fitting to said base.

23. In an artificial kidney system as claimed in claim 22 further including tracks fixed to said frame for slidably supporting said plates thereon.

24. In an artificial kidney system as claimed in claim 20 wherein said third means comprises a plate slidably mounted on said frame and operatively connected to one of said cam surfaces; and detent means for releasably retaining said coupling member on said plate.

25. In an artificial kidney system as claimed in claim 24 further including tracks fixed to said frame for slidably supporting said plate on said frame.

26. In an artificial kidney system as claimed in claim 20 wherein said cam plate comprises an integral part of plastic material defining said cam surfaces.

References Cited

UNITED STATES PATENTS

| | | | |
|---|---|---|---|
| 1,151,300 | 8/1915 | Soresi | 128—214 |
| 2,256,845 | 9/1941 | Lanninger | 285—312 X |
| 2,864,507 | 12/1958 | Isreeli | 210—321 |
| 2,880,501 | 4/1959 | Metz | 210—321 X |
| 3,016,249 | 1/1962 | Contreras et al. | 285—367 X |
| 3,051,316 | 8/1962 | MacNeill | 210—321 |
| 3,116,943 | 1/1964 | Wagner | 285—312 |

OTHER REFERENCES

Nayman: Trans. Amer. Soc. Artific. Inter. Organs, vol. 10, 1964, pp. 127–132.

Kolff: Jour. Labr. & Clin. Med., vol. 47, #6, June 1956, pp. 969–977.

DALTON L. TRULUCK, Primary Examiner

U.S. Cl. X.R.

285—33, 326